Patented Nov. 25, 1930

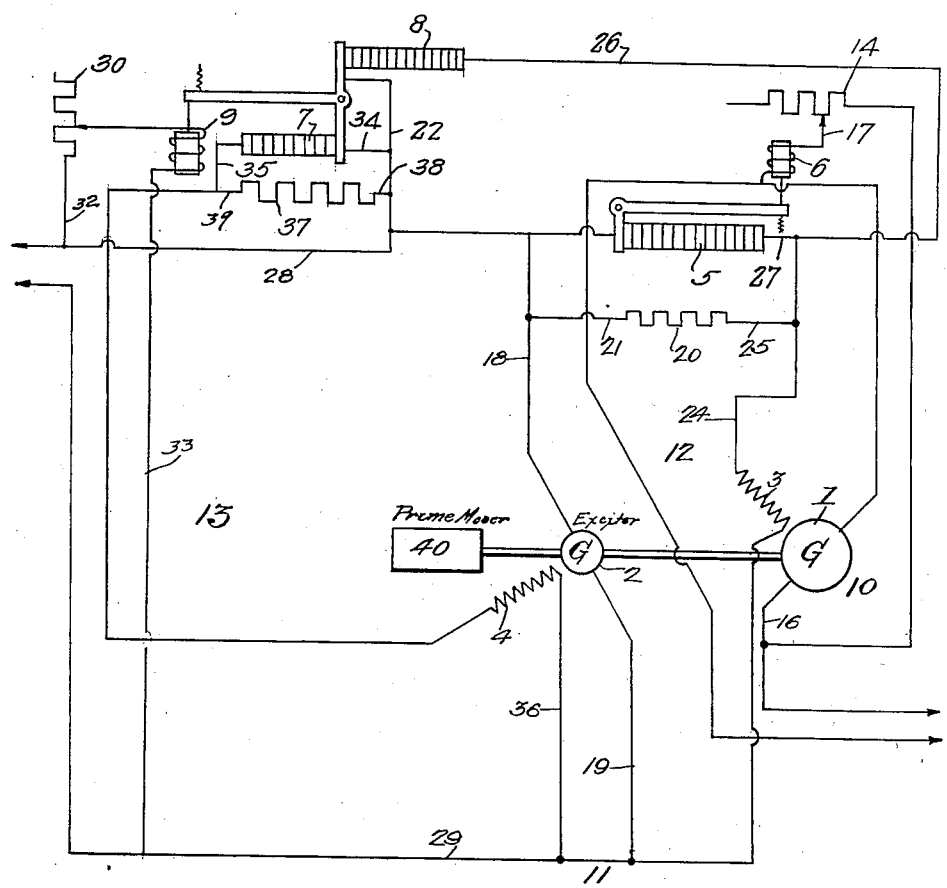

1,783,142

UNITED STATES PATENT OFFICE

CLINTON SAYRES AND DONALD C. PEABODY, OF PHILADELPHIA, PENNSYLVANIA, ASSIGNORS TO THE J. G. BRILL COMPANY, A CORPORATION OF PENNSYLVANIA

LOAD-REGULATING MEANS

Application filed September 2, 1927. Serial No. 217,294.

This invention relates to load regulating means.

The main object of our invention is to provide means whereby the speed of a prime mover used to run a D. C. generator for variable load purposes, is maintained substantially constant.

Another object of our invention is to provide means for automatically regulating the amount of current flowing through the field winding of an electric generator so as to control the generator field strength in such a way that any increase or decrease in the amperage requirements of the load on the generator armature will automatically increase or decrease the voltage generated by that armature to such an extent that the product of the generator voltage multiplied by the generator amperage will be a constant; this product representing the load on the generator.

Another object is to provide means for holding the load on prime movers used principally for driving direct current electric generators constant under varying amperage requirements, except that when the generated voltage attains a certain predetermined high limit, such voltage will not increase further, even though the amperage falls so low that the constant load on the prime mover is decreased.

Another object is to produce an efficient, strong and durable apparatus which may be economically constructed and operated.

Other objects and advantages will hereinafter appear.

The single view of the drawing illustrates diagrammatically an apparatus constructed according to the preferred embodiment of our invention.

Referring to the drawing, the invention includes two circuits consisting of a generator armature circuit 10, and an auxiliary generator circuit 11.

As indicated, the generator armature circuit 10 is electrically connected directly to the load.

The auxiliary generator circuit 11 has a main generator field circuit 12 and a field circuit 13 for an exciter generator 2.

The generator armature circuit 10 includes a coil 6 that is connected to the armature 1 of the main generator by a conductor 15, and a resistance element 14 that is connected to the generator by a conductor 16. The function of the resistance 14 is merely to insert a certain fixed minimum resistance in the circuit and if desired it might be omitted, the resistance of the associated coil being changed to accommodate for its omission. The same is true of the resistances 20, 30 and 37 described later in the specification which, if omitted, are provided for by changes in the resistance of the associated coils and piles. The coil 6 and the resistance element 14 are connected by a conductor 17.

The circuit 12 has an exciter generator 2, to the armature of which are connected conductors 18 and 19. The purpose of the auxiliary generator 2 is to supply low voltage direct current to the field and control circuits of the main generator.

The conductor 19 leads to the generator field 3 of the main generator 1.

The conductor 18 is connected to a resistance element 20, carbon pile 8, and carbon pile 5, by conductors 21, 22 and 23, respectively.

The generator field 3 is connected to the resistance element 20, carbon pile 8, and carbon pile 5, by a conductor 24, having branches 25, 26 and 27, respectively.

The circuit 13 has conductors 28 and 29, which are respectively connected to the conductors 18 and 19.

A coil 9 is connected to a resistance element 30 by a conductor 31.

The resistance element 30 is connected to the conductor 28 by a conductor 32, while the coil 9 is connected to the conductor 29 by a conductor 33.

A carbon pile 7 is also connected to the conductor 28 by a conductor 34.

The carbon pile 7 is connected to the exciter generator field 4 by a conductor 35.

The exciter generator field 4 is connected to the conductor 29 by a conductor 36.

A resistance element 37 is connected to the conductor 28 by a conductor 38, and to the conductor 35 by a conductor 39, while a prime mover 40 is mechanically connected to the armatures of generators 1 and 2 for the purpose of supplying them with motive power.

In the present embodiment of our invention we have chosen to utilize carbon pile regulators of the type in which an increase in voltage increases the pull of the coil and increases the pressure on the carbon discs, thereby decreasing the resistance. This general type of regulators is well known in the art and does not per se form the gist of our invention. On the other hand the carbon pile regulators are so constructed that a decrease of voltage decreases the pull of the coil, and the pressure on the carbon piles being decreased, the resistance is increased.

As shown, the coil 6 is across the generator armature, while the carbon pile 5 is inserted in the generator field circuit. Therefore, a high voltage on the coil 6, producing a strong pull, will tend to close the carbon pile 5 and still further increase the generated voltage, while a weak pull on the coil 6 will tend to open the carbon pile 5 and decrease the generated voltage.

A minimum and maximum generated voltage will obtain, depending on the closed and open resistance of the carbon pile.

As the prime mover 40 is started and brought up to speed, the generated voltage rises, first due to the prime mover speed increasing, and second, due to the closing the carbon pile 5 until a point is reached at which the generated voltage increases the load to more than the prime mover can pull. When this point is reached the prime mover begins to slow down, thus decreasing the generated voltage. This decrease in generated voltage serves to open the carbon pile 5 through action of coil 6 and thus further decreases the generated voltage until a point is reached at which the prime mover speeds up, and thus ad infinitum, producing slight continuous fluctuations in the saturation portions of a curve of speed of prime mover plotted against generator load, as abscissæ.

In other words, if the amperage changes we let the consequent slight change in prime mover speed initiate the necessary change in voltage to retain even load but let the regulator follow and equal the change indicated by the prime mover speed by weakening the generator field strength, thus weakening the generator load so that the prime mover speed will remain substantially at its governed speed.

The carbon piles 7 and 8 are arranged in different circuits. The coil 9 is connected across the armature of the auxiliary generator 2, while the carbon pile 8 is placed parallel with the carbon pile 5 in the generator field circuit, and the carbon pile 7 is placed in series with the auxiliary generator field.

The function of the coil 9 and carbon piles 7 and 8 is to produce an exciting voltage that which is substantially constant at armature speeds varying from the governed speed to a speed approximately 50% less than governed speed. The carbon piles 7 and 8 actuated by the coil 9 will therefore be open substantially the full amount at the governed speed of the prime mover, and fully shut at 50% or less than governed speed.

The design of coils for this purpose is believed to be obvious to one skilled in the art, and since they form no part of the present invention, any source of constant exciting potential being satisfactory, no attempt is made to describe their design in detail.

The carbon pile 8 is designed to counteract the unloading effect of the carbon pile 5 at a reduced throttle, so that when it is desirable for reasons of fuel economy, etc., to run at a reduced speed the prime mover may also be loaded down to its full economical capacity at that speed.

Now when the prime mover is slowed down, the load is lightened by carbon pile 5 so that the load taken off is more than proportionate to the decrease in speed, especially as such a reduction in speed of an electric generator in itself tends to reduce the voltage and decrease the load. However, there will be a decrease in speed due to the decrease in power of the prime mover and this will be reflected by the auxiliary generator 2. The coil 9 will then be actuated to close carbon pile 7, strengthening the auxiliary generator field 4, this maintaining a constant exciter voltage, and also closing carbon pile 8, strengthening the generator field. This will increase the load on the prime mover and will be adjusted to give whatever percentage of the full load that is desired.

The invention set forth herein is, of course, susceptible of various modifications and adaptations.

The invention claimed is:—

1. In a prime mover dynamo plant, a prime mover, a main generator including a field circuit and an armature circuit, an auxiliary generator including a field circuit and an armature circuit, said generators being driven by the prime mover, said auxiliary generator supplying field current to the main generator, a variable resistance in the field circuit of the main generator, a second variable resistance in the field circuit of the main generator, electro-magnetic means responsive to voltage fluctuations in the armature circuit of the main generator and controlling one of said resistances, and a second electro-magnetic means responsive to voltage fluctuations in the armature circuit of the auxiliary generator and controlling said second mentioned variable resistance, said first mentioned resistance being varied inversely as the armature voltage of the main generator, and the second mentioned resistance being varied directly as the armature voltage of the auxiliary generator.

2. In a prime mover dynamo plant, a prime mover, a main generator including a field circuit and an armature circuit, an auxiliary generator including a field circuit and an armature circuit, said generators being driven by the prime mover, said auxiliary generator supplying field current to the main generator, a variable resistance in the field circuit of the main generator, a second variable resistance in the field circuit of the main generator, electro-magnetic means responsive to voltage fluctuations in the armature circuit of the main generator and controlling one of said resistances, and a second electro-magnetic means responsive to voltage fluctuations in the armature circuit of the auxiliary generator and controlling said second mentioned variable resistance, said first mentioned resistance being varied inversely as the armature voltage of the main generator, and the second mentioned resistance being varied directly as the armature voltage of the auxiliary generator, and a variable resistance in the field circuit of the auxiliary generator, said resistance being controlled by the electro-magnetic means responsive to voltage fluctuations in the armature circuit of the auxiliary generator.

3. In a prime mover dynamo plant, a prime mover, a main generator including a field circuit and an armature circuit, an auxiliary generator including a field circuit and an armature circuit, said generators being driven by the prime mover, said auxiliary generator supplying field current to the main generator, a variable resistance in the field circuit of the main generator, a second variable resistance in the field circuit of the main generator, and electro-magnetic means associated with each of said resistances for varying the same, said electro-magnetic means being interconnected with the armature circuits of the generators for varying one of said resistances inversely and the other resistance directly as the speed of the prime mover varies.

4. In a prime mover dynamo plant, a prime mover, a main generator including a field circuit and an armature circuit, an auxiliary generator including a field circuit and an armature circuit, said main generator and auxiliary generator being driven by the prime mover, said auxiliary generator supplying field current to the main generator, a variable resistance in the field circuit of the main generator, a second variable resistance in the field circuit of the main generator, electro-magnetic means responsive to voltage fluctuations in the armature circuit of the main generator and varying one of said resistances inversely as said voltage varies, means for maintaining a constant output voltage for the auxiliary generator, said last mentioned means being also associated with the second mentioned variable resistance in the field circuit of the main generator and varying the same directly as the voltage of the auxiliary generator.

5. In a prime mover dynamo plant, a prime mover, a main generator including a field circuit and an armature circuit, an auxiliary generator including a field circuit and an armature circuit, said generators being driven by the prime mover, said auxiliary generator supplying field current to the main generator, means for maintaining a constant output voltage on the auxiliary generator, opposed variable resistances in the field circuit of the main generator, and electro-magnetic means responsive to speed fluctuations of the prime mover for varying one of said resistances inversely and the other of said resistances directly as said speed varies.

CLINTON SAYRES.
DONALD C. PEABODY.